US012606652B2

(12) United States Patent
Koenigs et al.

(10) Patent No.: US 12,606,652 B2
(45) Date of Patent: Apr. 21, 2026

(54) POLYMERIZATION OF C6—C14 A-OLEFIN MONOMERS AND POLYMERS THEREOF

(71) Applicant: Dow Global Technologies LLC, Midland, MI (US)

(72) Inventors: David Koenigs, Pearland, TX (US); Sean W. Ewart, Pearland, TX (US); Troy E. Knight, Missouri City, TX (US); Pritish M. Kamat, Pearland, TX (US); Lixin Sun, Sugar Land, TX (US); Roger L. Kuhlman, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 763 days.

(21) Appl. No.: 17/914,478

(22) PCT Filed: Mar. 26, 2021

(86) PCT No.: PCT/US2021/024424

§ 371 (c)(1),
(2) Date: Sep. 26, 2022

(87) PCT Pub. No.: WO2021/202294

PCT Pub. Date: Oct. 7, 2021

(65) Prior Publication Data

US 2023/0127996 A1 Apr. 27, 2023

Related U.S. Application Data

(60) Provisional application No. 63/003,074, filed on Mar. 31, 2020.

(51) Int. Cl.
*C08F 110/14* (2006.01)
*C08F 4/659* (2006.01)

(52) U.S. Cl.
CPC ........ *C08F 110/14* (2013.01); *C08F 4/65908* (2013.01)

(58) Field of Classification Search
CPC .............. C08F 4/64193; C08F 4/64196; C08F 4/64189
See application file for complete search history.

(56) References Cited

U.S. PATENT DOCUMENTS

| | | | |
|---|---|---|---|
| 4,289,679 A | 9/1981 | Mack | |
| 4,493,903 A | 1/1985 | Mack | |
| 5,536,802 A * | 7/1996 | Stricklen | C08F 10/14 526/348 |
| 6,015,779 A | 1/2000 | Eaton et al. | |
| 6,232,421 B1 | 5/2001 | Fujita et al. | |
| 6,596,832 B2 | 7/2003 | Johnston et al. | |
| 7,358,572 B2 | 4/2008 | Voldman | |
| 8,106,114 B2 | 1/2012 | Eaton et al. | |
| 8,957,171 B2 | 2/2015 | Giesbrecht et al. | |
| 9,969,826 B2 | 5/2018 | Atiqullah et al. | |
| 11,447,586 B2 | 9/2022 | Keaton et al. | |
| 2002/0173569 A1 | 11/2002 | Karhu et al. | |
| 2003/0065055 A1 | 4/2003 | Johnston et al. | |
| 2011/0105642 A1 | 5/2011 | Eaton et al. | |
| 2015/0148502 A1* | 5/2015 | Christianson | C08F 4/78 502/155 |
| 2015/0291713 A1 | 10/2015 | Klosin et al. | |
| 2020/0017611 A1* | 1/2020 | Fontaine | C08F 4/65908 |
| 2020/0109220 A1 | 4/2020 | Do et al. | |

FOREIGN PATENT DOCUMENTS

| | | | |
|---|---|---|---|
| CN | 1500814 A | 5/2006 | |
| CN | 108456234 A | 8/2018 | |
| WO | WO-2018183700 A1 * | 10/2018 | C08F 210/16 |

OTHER PUBLICATIONS

Suzuki, N. et al., "Olefin Polymeri Zation Using Highly Congested Ansa-Metallocenes Under High Pressure: Formation of Superhigh Molecular Weight Polyolefins", Macromolecules, Ameri An Chemical Society, vol. 33, No. 3, Feb. 18, 2000 (Feb. 18, 2000), pp. 754-759.

Ilya E. Nifant'Ev, et al., "The synthesis of ultra-high molecular weight poly(1-hexene)s by low-temperature ziegler-natta precipitation polymerization in fluorous reaction media," Polymer, Mar. 14, 2018, vol. 139, pp. 98-106, example f16, Table 3 and 4; and figure 3a.

* cited by examiner

*Primary Examiner* — Karuna P Reddy
(74) *Attorney, Agent, or Firm* — Boyle Fredrickson S.C.

(57) ABSTRACT

The present disclosure provides a process. In an embodiment, the process includes contacting, under polymerization conditions, one or more $C_6$-$C_{14}$ α-olefin monomers with a bis-biphenylphenoxy catalyst. The process includes forming a polymer composed of one or more $C_6$-$C_{14}$ α-olefin monomers, and having an absolute weight average molecular weight ($Mw_{(abs)}$) greater than 1,300,000 g/mol and a $Mw_{(abs)}/Mn_{(abs)}$ from 1.3 to 3.0.

10 Claims, No Drawings

POLYMERIZATION OF C6—C14 A-OLEFIN MONOMERS AND POLYMERS THEREOF

BACKGROUND

Olefin based polymers such as polyhexene and/or polyoctene are produced via various catalyst systems. Selection of such catalyst systems used in the polymerization process of the olefin based polymers is an important factor contributing to the characteristics and properties of such olefin based polymers.

Polyhexene and polyoctene are manufactured for a wide variety of articles. The polymerization process can be varied in a number of respects to produce a wide variety of resultant polyoctene and polyhexene resins having different physical properties that render the various resins suitable for use in different applications. The monomers (hexene or octene) and optionally one or more co-monomers are present in liquid diluents, such as an alkane or isoalkane, for example isobutane. Hydrogen may also be added to the polymerization reactor. The catalyst systems for producing olefin-based polymer resins are typically selected from a chromium-based catalyst system, a Ziegler-Natta catalyst system, and a molecular (either metallocene or post-metallocene) catalyst system. The reactants in the diluent and the catalyst system are circulated at polymerization temperature around the reactor, thereby producing homopolymer or copolymer. Either periodically or continuously, part of the reaction mixture, including the polymer product dissolved in the diluent, together with unreacted one or more optional co-monomers, is removed from the polymerization reactor. The reaction mixture when removed from the reactor may be processed to remove the polymer product from the diluent and the unreacted reactants, with the diluent and unreacted reactants typically being recycled back into the polymerization reactor. Alternatively, the reaction mixture may be sent to a second polymerization reactor serially connected to the first polymerization reactor where a second polymer fraction may be produced.

Despite the on-going efforts in developing catalyst systems suitable for olefin polymerization, such as polyoctene or polyhexene polymerization, the art recognizes the need for catalyst systems with increased catalytic efficiency that are capable of producing olefin-based polymer (and polyhexene and polyoctene in particular) with high molecular weight (greater than 1,000,000 g/mol) and a narrow molecular weight distribution (MWD less than 3.0).

SUMMARY

The present disclosure provides a process. In an embodiment, the process includes contacting, under polymerization conditions, one or more $C_6$-$C_{14}$ α-olefin monomers with a bis-biphenylphenoxy catalyst. The process includes forming a polymer composed of one or more $C_6$-$C_{14}$ α-olefin monomers, and having an absolute weight average molecular weight ($Mw_{(abs)}$) greater than 1,300,000 g/mol and a $Mw_{(abs)}/Mn_{(abs)}$ from 1.3 to 3.0.

The present disclosure provides a composition. In an embodiment, the composition includes a polymer composed of one or more $C_6$-$C_{14}$ α-olefin monomers. The polymer includes a residual amount of zirconium and the polymer has an absolute weight average molecular weight ($Mw_{(Abs)}$) greater than 1,300,000 g/mol and a $Mw_{(Abs)}/Mn_{(Abs)}$ from 1.3 to 3.0.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., the range 1-7 above includes subranges of 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

The term "1-hexene," as used herein, is an unsaturated hydrocarbon α-olefin having the molecular formula $C_6H_{12}$ and the unsaturation is at the alpha position. 1-hexene has the molecular Structure (A) as shown below.

Structure (A)

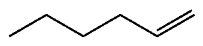

A "hexene-based polymer" is a polymer that contains more than 50 weight percent (wt %) polymerized hexene monomer (based on the total amount of polymerizable monomers) and, optionally, may contain at least one comonomer different than hexene (such as one selected from $C_{2-7}$ α-olefin and/or $C_{9-12}$ α-olefin. Hexene-based polymer includes hexene homopolymer, and hexene copolymer (meaning units derived from hexene and one or more comonomers). The terms "hexene-based polymer" and "polyhexene" may be used interchangeably.

The term "1-octene," as used herein, is an unsaturated hydrocarbon α-olefin having the molecular formula $C_8H_{16}$ and the unsaturation is at the alpha position. 1-octene has the molecular Structure (B) as shown below.

Structure (B)

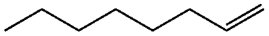

The term "isomer of octene," as used herein, is an unsaturated hydrocarbon having the molecular formula $C_8H_{16}$, and the unsaturation (the double bond) is not at the alpha position. In other words, the term "isomer of octene" is any octene to the exclusion of 1-octene. Nonlimiting examples of isomers of octene include cis-2-octene, trans-2-octene, cis-3-octene, trans-3-octene, and combinations thereof as well as cis-4-octene, trans-4-octene, branched octene isomers and combinations of thereof.

An "octene-based polymer" is a polymer that contains more than 50 weight percent (wt %) polymerized octene monomer (based on the total amount of polymerizable monomers) and, optionally, may contain at least one comonomer different than octene (such as one selected from $C_{2-7}$ α-olefin and/or $C_{9-12}$ α-olefin. Octene-based polymer includes octene homopolymer, and octene copolymer (meaning units derived from octene and one or more comonomers). The terms "octene-based polymer" and "polyoctene" may be used interchangeably.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "octene/α-olefin polymer" are indicative of copolymer as described above prepared from polymerizing ethylene or octene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

Test Methods

Gel Permeation Chromatography (GPC)

The chromatographic system consisted of a PolymerChar GPC-IR (Valencia, Spain) high temperature GPC chromatograph equipped with an internal IR5 infra-red detector (IR5). The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. A third-order polynomial was used to fit the respective polystyrene-equivalent calibration points.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max}}{\text{Peak Width at } \frac{1}{2} \text{ height}} \right)^2 \quad \text{(EQ2)}$$

wherein RV is the retention volume in milliliters, the peak width is in milliliters, the peak max is the maximum height of the peak, and ½ height is ½ z height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad \text{(EQ3)}$$

wherein RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polystyrene equivalent molecular weight obtained from the narrow standard calibration curve for the point (i) from Equation 1.

$$Mn_{(GPC)} = \frac{\sum^{i} IR_i}{\sum^{i}\left(IR_i \Big/ M_{polyethylene_i}\right)} \quad \text{(EQ 4)}$$

$$Mw_{(GPC)} = \frac{\sum^{i}\left(IR_i * M_{polyethylene_i}\right)}{\sum^{i} IR_i} \quad \text{(EQ 5)}$$

$$Mz_{(GPC)} = \frac{\sum^{i}\left(IR_i * M_{polyethylene_i}^2\right)}{\sum^{i}\left(IR_i * M_{polyethylene_i}\right)} \quad \text{(EQ 6)}$$

In order to monitor the deviations over time, a flowrate marker (decane) was introduced into each sample via a micropump controlled with the PolymerChar GPC-IR system. This flowrate marker (FM) was used to linearly correct the pump flowrate ($Flowrate_{(nominal)}$) for each sample by RV alignment of the respective decane peak within the sample ($RV_{(FM\ Sample)}$) to that of the decane peak within the narrow standards calibration ($RV_{(FM\ Calibrated)}$). Any changes in the time of the decane marker peak are then assumed to be related to a linear-shift in flowrate ($Flowrate_{(effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−1% of the nominal flowrate.

$$Flowrate_{(effective)} = Flowrate_{(nominal)} * (RV_{(FM\ Calibrated)} / RV_{(FM\ Sample)}) \quad \text{(EQ7)}$$

Triple Detector GPC (TDGPC)

The chromatographic system, run conditions, column set, column calibration and calculation conventional molecular weight moments and the distribution were performed according to the method described in Gel Permeation Chromatography (GPC).

For the determination of the viscometer and light scattering detector offsets from the IR5 detector, the Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a linear polyethylene standard with a molecular weight of about 120,000 g/mole. The viscometer calibration (determined using GPCOne™) can be accomplished using the methods described by the manufacturer, or, alternatively, by using the published values of suitable linear standards. A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

The absolute weight average molecular weight ($Mw_{(Abs)}$) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are linearly extrapolated at chromatographic ends where signal to noise becomes low (using GPCOne™). Other respective moments, $Mn_{(Abs)}$ and $Mz_{(Abs)}$ are be calculated according to equations 8-9 as follows $$Mn_{(Abs)} = \frac{\sum^{i} IR_i}{\sum^{i}\left(IR_i \Big/ M_{Absolute_i}\right)} \quad \text{(EQ 8)}$$

$$Mz_{(Abs)} = \frac{\sum^{i}\left(IR_i * M_{Absolute_i}^2\right)}{\sum^{i}\left(IR_i * M_{Absolute_i}\right)} \quad \text{(EQ9)}$$

Residual amount of catalyst metal. A "residual amount" of catalyst metal (Ti, Hf, Zr, and Ge) is from 0 ppm, or greater than 0 ppm to less than 300 ppm, and was determined by mass balance based on added catalyst and the amount of polymer formed during reaction. Results are reported in parts per million (ppm).

DETAILED DESCRIPTION

The present disclosure provides a process. In an embodiment, the process includes contacting, under polymerization conditions, one or more $C_6$-$C_{14}$ α-olefin monomers with a bis-biphenylphenoxy catalyst. The process includes forming a polymer composed of one or more $C_6$-$C_{14}$ α-olefin monomers, the polymer having an absolute weight average molecular weight ($Mw_{(Abs)}$) greater than 1,300,000 g/mol and a $Mw_{(Abs)}/Mn_{(Abs)}$ from 1.3 to 3.0.

The process includes contacting, under polymerization conditions, one or more $C_6$-$C_{14}$ α-olefin monomers with a bis-biphenylphenoxy catalyst. As used herein, "polymerization conditions," are temperature, pressure, reactant concentrations, solvent selection, chain transfer agent (CTA), reactant mixing/addition parameters, and other conditions within a polymerization reactor that promote reaction between the reagents and formation of the resultant product, namely a polymer composed of one or more $C_6$-$C_{14}$ α-olefin monomers. Polymerization may be conducted in a tubular reactor, in a stirred autoclave, a continuous stirred tank reactor, a gas phase polymerization reactor, a slurry phase polymerization reactor, a loop reactor, an isothermal reactor, a fluidized bed gas phase reactor and combinations thereof in a batch process or a continuous process.

Under polymerization conditions, the one or more $C_6$-$C_{14}$ α-olefin monomers are contacted with a bis-biphenylphenoxy catalyst (or interchangeably referred to as "BBP"). The bis-biphenylphenoxy catalyst is a metal-ligand complex with a structure as shown in formula (I) below:

formula (I)

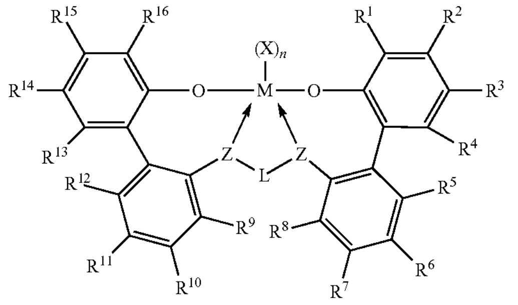

wherein

M is a metal selected from zirconium or hafnium, the metal being in a formal oxidation state of +2, +3, or +4;

n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and each Z independently is O, S, N($C_1$-$C_{40}$)hydrocarbyl, or P($C_1$-$C_{40}$)hydrocarbyl; and O is O (an oxygen atom);

L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groups in formula (I) (to which L is bonded) or the ($C_1$-$C_{40}$)heterohydrocarbylene has a portion that comprises a 1-atom to 10-atom linker backbone linking the two Z groups in formula (I), wherein each of the 1 to 10 atoms of the 1-atom to 10-atom linker backbone of the ($C_1$-$C_{40}$) heterohydrocarbylene independently is a carbon atom or heteroatom, wherein each heteroatom independently is O, S, S(O), $S(O)_2$, $Si(R^C)_2$, $Ge(R^C)_2$, $P(R^C)$, or $N(R^C)$, wherein independently each $R^C$ is ($C_1$-$C_{30}$) hydrocarbyl or ($C_1$-$C_{30}$) heterohydrocarbyl; and each $R^{1-16}$ is selected from ($C_1$-$C_{40}$)hydrocarbyl, ($C_1$-$C_{40}$) heterohydrocarbyl, $Si(R^C)_3$, $Ge(R^C)_3$, $P(R^C)_2$, $N(R^C)_2$, $OR^C$, $SR^C$, $NO_2$, CN, $CF_3$, $R^CS(O)$, $R^CS(O)_2$, $(R^C)_2C{=}N$, $R^CC(O)O$, $R^COC(O)$, $R^CC(O)N(R)$, $(R^C)_2NC(O)$, halogen atom, hydrogen atom, and combinations thereof.

The bis-biphenylphenoxy catalyst with structure of formula (I) may be rendered catalytically active by contacting the metal-ligand complex to, or combining the metal-ligand complex with, an activating co-catalyst.

Nonlimiting examples of suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). Combinations of one or more of the foregoing activating co-catalysts and techniques are also contemplated. The term"alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Nonlimiting examples of suitable Lewis acid activators (co-catalysts) include Group 13 metal compounds containing from 1 to 3 ($C_1$-$C_{20}$)hydrocarbyl substituents as described herein. In one embodiment, Group 13 metal compounds are tri(($C_1$-$C_{20}$)hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tetrakis(($C_1$-$C_{20}$)hydrocarbyl borate or a tri(($C_1$-$C_{20}$)hydrocarbyl)ammonium tetrakis(($C_1$-$C_{20}$)hydrocarbyl)borate (e.g. bis(octadecyl)methylammonium tetrakis(pentafluorophenyl)borate). As used herein, the term "ammonium" means a nitrogen cation that is a (($C_1$-$C_{20}$) hydrocarbyl$N(H)_3^+$, or $N(H)_4^+$, wherein each ($C_1$-$C_{20}$)hydrocarbyl, when two or more are present, may be the same or different.

Nonlimiting examples of combinations of neutral Lewis acid activators (co-catalysts) include mixtures comprising a combination of a tri(($C_1$-$C_4$)alkyl)aluminum and a halogenated tri(($C_6$-$C_{13}$)aryl)boron compound, especially a tris (pentafluorophenyl)borane. Other embodiments are combinations of such neutral Lewis acid mixtures with a polymeric or oligomeric alumoxane, and combinations of a single neutral Lewis acid, especially tris(pentafluorophenyl) borane with a polymeric or oligomeric alumoxane. Ratios of numbers of moles of (metal-ligand complex):(tris(pentafluoro-phenylborane):(alumoxane) [e.g., (Group 4 metal-ligand complex):(tris(pentafluoro-phenylborane):(alumoxane)] are from 1:1:1 to 1:10:100, in other embodiments, from 1:1:1.5 to 1:5:30.

The bis-biphenylphenoxy catalyst with structure of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl tetrakis(pentafluorophenyl)borate(1<->) amine (i.e. $[HNMe(C_{18}H_{37})_2][B(C_6F_5)_4]$), and combinations of both.

One or more of the foregoing activating co-catalysts are used in combination with each other. In an embodiment, the co-catalyst is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

In an embodiment, the bis-biphenylphenoxy catalyst with structure of formula (I) includes the metal M that is zirconium.

The process includes contacting the one or more $C_6$-$C_{14}$ α-olefin monomers under polymerization conditions with the bis-biphenylphenoxy catalyst of formula (I), and forming a polymer composed of one or more $C_6$-$C_{14}$ α-olefin monomers. The polymer can be a homopolymer of one monomer selected from $C_6$-$C_{14}$ α-olefin (hereafter "a $C_6$-$C_{14}$ α-olefin homopolymer"), a copolymer with two monomers selected from $C_6$-$C_{14}$ α-olefin (hereafter "a $C_6$-$C_{14}$ α-olefin copolymer"), or a terpolymer with three monomers selected from $C_6$-$C_{14}$ α-olefin (hereafter "a $C_6$-$C_{14}$ α-olefin terpolymer"). The polymer (i.e., the $C_6$-$C_{14}$ α-olefin homopolymer, the $C_6$-$C_{14}$ α-olefin copolymer, or the $C_6$-$C_{14}$ α-olefin terpolymer) has an absolute weight average molecular weight ($Mw_{(Abs)}$) greater than 1,300,000 g/mol and a $Mw_{(Abs)}/Mn_{(Abs)}$ from 1.3 to 3.0.

The polymer (i.e., the $C_6$-$C_{14}$ α-olefin homopolymer, the $C_6$-$C_{14}$ α-olefin copolymer, or the $C_6$-$C_{14}$ α-olefin terpolymer) includes a residual amount of zirconium, or hafnium or from greater than 0 ppm to 300 ppm zirconium and contains little, or no, titanium or from 0 ppm to less than 10 ppm titanium.

In an embodiment, the bis-biphenylphenoxy catalyst is a metal-ligand complex having the structure formula (V) below:

formula (V)

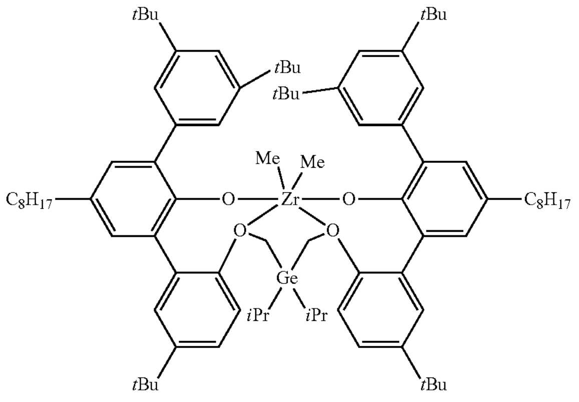

wherein Ge is germanium, Me is a methyl group, tBu is a t-butyl group, and iPr is an isopropyl group. The process includes contacting the one or more $C_6$-$C_{14}$ α-olefin monomers under polymerization conditions with the bis-biphenylphenoxy catalyst of formula (V), and forming a polymer (i.e., a $C_6$-$C_{14}$ α-olefin homopolymer, a $C_6$-$C_{14}$ α-olefin copolymer, or a $C_6$-$C_{14}$ α-olefin terpolymer). The polymer (i.e., the $C_6$-$C_{14}$ α-olefin homopolymer, the $C_6$-$C_{14}$ α-olefin copolymer, or the $C_6$-$C_{14}$ α-olefin terpolymer) has one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of germanium, or from greater than 0 ppm, or 1 ppm to less than 300 ppm, or from 10 ppm to 200 ppm, or from 12 ppm to 150 ppm, or from 14 ppm to 130 ppm, or from 14 ppm to 125 ppm germanium; and/or (iv) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium.

In an embodiment, the bis-biphenylphenoxy catalyst is a metal-ligand complex having the structure formula (VI) below:

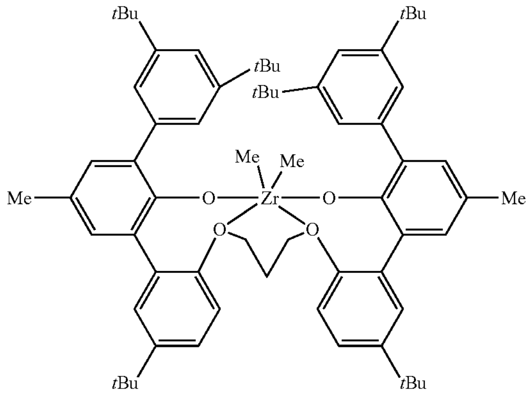

wherein Me is a methyl group, and tBu is a t-butyl group. The process includes contacting the one or more $C_6$-$C_{14}$ α-olefin monomers under polymerization conditions with the bis-biphenylphenoxy catalyst of formula (VI), and forming an octene polymer having one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium (hereafter Polymer1).

In an embodiment, the zirconium is present in the polymer composed of one or more $C_6$-$C_{14}$ α-olefins (Polymer1) to the exclusion of titanium and/or to the exclusion of hafnium.

In an embodiment, the process includes contacting, under polymerization conditions, one or more $C_6$-$C_8$ α-olefin monomers with the bis-biphenylphenoxy catalyst having the formula (I) or formula (V), or formula (VI). The process includes forming a polymer composed of one or more $C_6$-$C_8$ α-olefin monomers. The polymer composed of one or more $C_6$-$C_8$ α-olefin monomers is a hexene homopolymer, a heptene homopolymer, an octene homopolymer, a hexene/heptene copolymer, a hexene/octene copolymer, a heptene/octene copolymer, or a hexene/heptene/octene terpolymer. The polymer composed of one or more $C_6$-$C_8$ α-olefin monomers has one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of germanium, or from greater than 0 ppm, or 1 ppm to less than 300 ppm, or from 10 ppm to 200 ppm, or from 12 ppm to 150 ppm, or from 14 ppm to 130 ppm, or from 14 ppm to 125 ppm germanium; and/or (iv) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium (hereafter Polymer2).

In an embodiment, the zirconium and/or the germanium is present in the polymer composed of one or more $C_6$-$C_8$ α-olefins (Polymer2) to the exclusion of titanium. In a further embodiment, the polymer composed of one or more $C_6$-$C_8$ α-olefin monomers (Polymer2) contains a residual amount of zirconium (and optionally a residual amount of germanium) and further contains from 0 ppm to less than 10 ppm titanium.

In an embodiment, the process includes contacting, under polymerization conditions, octene monomer with the bis-biphenylphenoxy catalyst having the formula (I) or formula (V), or formula (VI). The process includes forming an octene homopolymer. The octene homopolymer has one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of germanium, or from greater than 0 ppm, or 1 ppm to less than 300 ppm, or from 10 ppm to 200 ppm, or from 12 ppm to 150 ppm, or from 14 ppm to 130 ppm, or from 14 ppm to 125 ppm germanium; and/or (iv) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium (hereafter Polymer3).

In an embodiment, the zirconium and/or the germanium is present in the octene homopolymer (Polymer3) to the exclusion of titanium, or from 0 ppm to less than 10 ppm titanium.

In an embodiment, the process includes contacting, under polymerization conditions, hexene monomer with the bis-biphenylphenoxy catalyst having the formula (I) of formula (V), or formula (VI). The process includes forming a hexene homopolymer. The hexene homopolymer has one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of germanium, or from greater 0 ppm, or than 1 ppm to less than 300 ppm, or from 10 ppm to 200 ppm, or from 12 ppm to 150 ppm, or from 14 ppm to 130 ppm, or from 14 ppm to 125 ppm germanium; and/or (iv) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium (hereafter Polymer4).

In an embodiment, the germanium and/or the zirconium is present in the hexene homopolymer (Polymer4) to the exclusion of titanium, or from 0 ppm to less than 10 ppm titanium.

2. Composition

The present disclosure provides a composition. In an embodiment, the composition includes a polymer composed of one or more $C_6$-$C_{14}$ α-olefin monomers (i.e., the $C_6$-$C_{14}$ α-olefin homopolymer, the $C_6$-$C_{14}$ α-olefin copolymer, or the $C_6$-$C_{14}$ α-olefin terpolymer). The polymer composed of one or more $C_6$-$C_{14}$ α-olefin monomers has one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of germanium, or from greater than 0 ppm, or 1 ppm to less than 300 ppm, or from 10 ppm to 200 ppm, or from 12 ppm to 150 ppm, or from 14 ppm to 130 ppm, or from 14 ppm to 125 ppm germanium; and/or (iv) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium (Polymer1).

In an embodiment, the germanium and/or the zirconium is present in the polymer composed of one or more $C_6$-$C_{14}$ α-olefins (Polymer1) to the exclusion of titanium and/or to the exclusion of hafnium. In a further embodiment, the polymer composed of one or more $C_6$-$C_{14}$ α-olefins (Polymer1) contains a residual amount of zirconium (and optionally a residual amount of germanium) and from 0 ppm to less than 10 ppm titanium.

In an embodiment the composition includes a polymer composed of one or more $C_6$-$C_8$ α-olefin monomers. The polymer composed of one or more $C_6$-$C_8$ α-olefin monomers is a hexene homopolymer, a heptene homopolymer, an octene homopolymer, a hexene/heptene copolymer, a hexene/octene copolymer, a heptene/octene copolymer, or a hexene/heptene/octene terpolymer. The polymer composed of one or more $C_6$-$C_8$ α-olefin monomers contains a residual amount of germanium and has one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of germanium, or from greater than 0 ppm, or 1 ppm to less than 300 ppm, or from 10 ppm to 200 ppm, or from 12 ppm to 150 ppm, or from 14 ppm to 130 ppm, or from 14 ppm to 125 ppm germanium; and/or (iv) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium (Polymer2).

In an embodiment, the germanium and/or the zirconium is present in the polymer composed of one or more $C_6$-$C_8$ $\alpha$-olefins (Polymer2) to the exclusion of titanium and/or to the exclusion of hafnium. In a further embodiment, the polymer composed of one or more $C_6$-$C_8$ $\alpha$-olefins (Polymer2) contains a residual amount of zirconium (and optionally a residual amount of germanium) and from 0 ppm to less than 10 ppm titanium.

In an embodiment, the composition includes an octene homopolymer. The octene homopolymer has one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of germanium, or from greater than 0 ppm, or 1 ppm to less than 300 ppm, or from 10 ppm to 200 ppm, or from 12 ppm to 150 ppm, or from 14 ppm to 130 ppm, or from 14 ppm to 125 ppm germanium; and/or (iv) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium (Polymer3).

In an embodiment, the zirconium is present in the octene homopolymer (Polymer3) to the exclusion of titanium. In a further embodiment, the octene homopolymer (Polymer3) contains a residual amount of zirconium (and optionally a residual amount of germanium and from 0 ppm to less than 10 ppm titanium.

In an embodiment, the composition includes a hexene homopolymer. The hexene homopolymer has one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of germanium, or from greater than 0 ppm, or 1 ppm to less than 300 ppm, or from 10 ppm to 200 ppm, or from 12 ppm to 150 ppm, or from 14 ppm to 130 ppm, or from 14 ppm to 125 ppm germanium; and/or (iv) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium (Polymer4).

In an embodiment, the zirconium is present in the hexene homopolymer (Polymer4) to the exclusion of titanium. In a further embodiment, the hexene homopolymer (Polymer4) contains a residual amount of zirconium (and optionally a residual amount of germanium) and from 0 ppm to less than 10 ppm titanium.

By way of example, and not limitation, some embodiments of the present disclosure will now be described in detail in the following Examples.

Examples

The catalysts used in the comparative samples (CS) are provided in Table 1 below. Catalysts used in the inventive examples (IE) are provided in Table 2 below.

TABLE 1

Catalysts used to produce comparative samples

| Comparative Catalysts | Chemical formula |
|---|---|
| Ziegler-Natta Catalyst (ZN) | BuEtMg, $MgCl_2$, $Ti(O/Pr)_4$<br>3 Ti: 40 Mg: 12 Al |
| Constrained geometry Catalyst (CGC) | 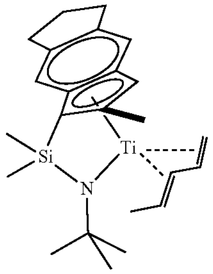<br>Titanium, [N-(1,1-dimethylethyl)-1,1-dimethyl-1-[(1,2,3,3a,8a-.eta.)-1,5,6,7-tetrahydro-2-methyl-s-indacen-1-yl]silanaminato(2-)-.kappa.N][(1,2,3,4-.eta.)-1,3-pentadiene]-, stereoisomer CAS 199876-48-7; CAS 200074-30-2 |

TABLE 1-continued

| Catalysts used to produce comparative samples | |
|---|---|
| Comparative Catalysts | Chemical formula |
| Metallocene catalyst 1 (Metallocene 1) | 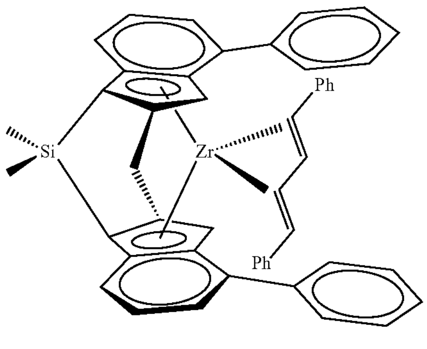 rac-dimethylsilyl-bis-(2-methyl-4-phenyl-n5-indenyl) zirconium (n4-trans-trans-1,4 diphenyl-1,3-butadiene) |
| Metallocene catalyst 2 (Metallocene 2) | 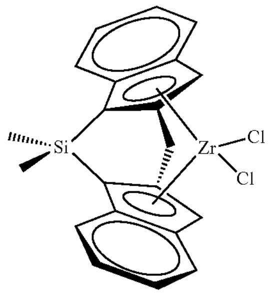 rac-dimethylsilyl-bis-(2-methyl-4-phenyl-n5-indenyl) zirconium dichloride |

TABLE 2

| Catalysts used to produce inventive examples | |
|---|---|
| Inventive catalysts | Chemical formula |
| BBP1 | Bis-biphenylphenoxy catalyst (BBP1) formula (V) 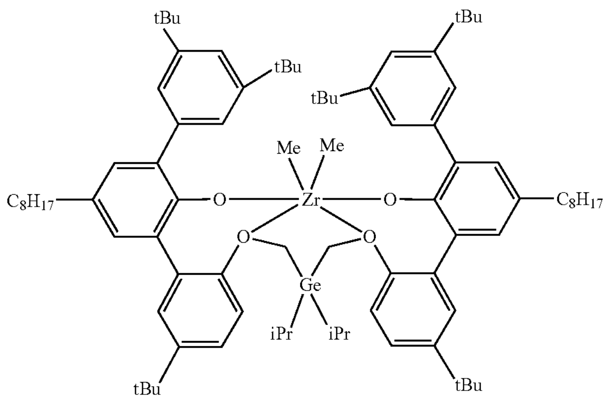 |

TABLE 2-continued

| Catalysts used to produce inventive examples | |
|---|---|
| Inventive catalysts | Chemical formula |
| | Zirconium, [[2,2'''-[[bis[l-methylethyl)germylene]bis(methyleneoxy-.kappa.O)]bis[3'',5,5''-tris(1,1-dimethylethyl)-5'-octyl[1,1':3',l''-terphenyl]-2'-olato-κO]](2-)]dimethyl- CAS 958647-88-6 |
| BBP2 | Bis-biphenylphenoxy catalyst (BBP 2) 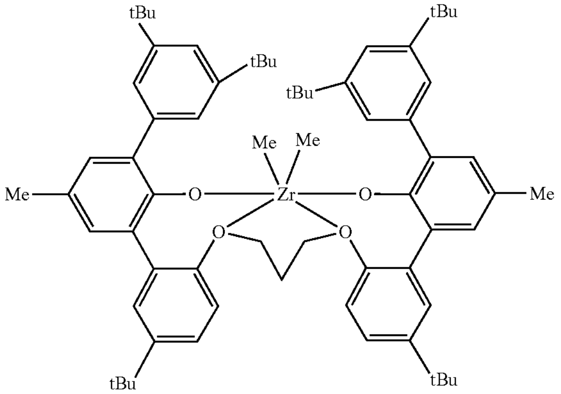 Zirconium, dimethyl[[2,2'''-[1,3-propanediylbis(oxy-κO)]bis[3'',5,5''-tris(1,1-dimethylethyl)-5'-methyl[1,1':3',1''-terphenyl]-2'-olato-κO]](2-)]-, CAS 958647-88-6; CAS 1001417-33-9 |

A. Polymerization of 1-hexene and 1-octene

For comparative sample 1 (CS1), polymerization is conducted with a Ziegler-Natta Catalyst (ZN), in a 40 mL vial charged with 4 mL 1-octene and 8 mL solvent (Isopar E), 4 μmol catalyst (ZN), and 5 eq. of $Et_3Al$ (as an activator), for a period of twelve hours and at a temperature of 23-25° C. Then, solvent is removed under a vacuum.

For comparative sample 2 (CS2), polymerization is conducted with a CGC Catalyst (as shown in Table 1), in a 40 mL vial charged 4 mL 1-octene and 8 mL solvent (Isopar E), 4 μmol catalyst, 1.2 eq RIBS-2, for a period of twelve hours and at a temperature of 23-25° C. Then, solvent is removed under a vacuum For comparative sample 3 (CS3), polymerization is conducted with a metallocene 1 catalyst (as shown in Table 1), in a 40 mL vial charged 6 mL 1-octene and 12 mL solvent (Isopar E), 2 μmol catalyst, 1.2 eq RIBS-2, 10 eq MMAO 3A, for a period of twelve hours and at a temperature of 23-25° C. Then, solvent and unreacted octene isomers are removed under a vacuum.

For comparative sample 4 (CS4), polymerization is conducted with a metallocene 2 catalyst (as shown in Table 1), in a 40 mL vial charged 6 mL 1-octene and with 12 mL solvent (Isopar E), 2 μmol catalyst, 1.2 eq RIBS-2, 10 eq MMAO 3A for a period of twelve hours and at a temperature of 23-25° C. Then, solvent and unreacted octene isomers are removed under a vacuum.

For inventive examples 1-4 (IE1-4), polymerization is conducted with a bis-biphenylphenoxy catalyst (BBP1) in a 40 mL vial charged with 8 mL 1-octene and 12 mL Isopar-E (in Isopar E), 4 μmol catalyst, and 1.2 eq. RIBS-2 ($R_2N(H)Me\ B(C_6F_5)_4$, wherein R is hydrogenated tallowalkyl ($C_{14-18}$ alkyl)(CAS number 200644-82-2) as an activator), for a period of twelve hours and at a temperature of 23-25° C. Then, solvent is removed under a vacuum.

For inventive example 5 (IE5), polymerization is conducted with a bis-biphenylphenoxy catalyst (BBP1) in a 40 mL vial charged with 8 mL 1-hexene and 12 mL Isopar-E, 4 μmol catalyst, and 1.2 eq. RIBS-2 ($R_2N(H)Me\ B(C_6F_5)_4$, wherein R is hydrogenated tallowalkyl ($C_{14-18}$ alkyl)(CAS number 200644-82-2) as an activator), for a period of twelve hours and at a temperature of 23-25° C. Then, solvent and unreacted hexene isomers are removed under a vacuum.

For inventive examples 6-7 (IE6-7), polymerization is conducted with a bis-biphenylphenoxy catalyst (BBP2) in a 40 mL vial charged with 8 mL 1-octene and 12 mL Isopar-E (in Isopar E), 4 μmol catalyst, and 1.2 eq. RIBS-2 ($R_2N(H)Me\ B(C_6F_5)_4$, wherein R is hydrogenated tallowalkyl ($C_{14-18}$ alkyl)(CAS number 200644-82-2) as an activator), for a period of twelve hours and at a temperature of 23-25° C. Then, solvent and unreacted octene isomers are removed under a vacuum.

The properties of the resulting octene homopolymers (and hexene homopolymer) are provided in Table 3 below.

TABLE 3

| Polymer properties | | | | | | | |
|---|---|---|---|---|---|---|---|
| Sample | Monomer | Polymerization Catalyst | Mw (Abs) (g/mol) | Mn (Abs) (g/mol) | Mw (Abs)/Mn (Abs) | Residual Catalyst Metal[1] | Residual Germanium[1] |
| CS1 | 1-Octene in Isopar E | ZN | 1,246,812 | 150,153 | 8.30 | 77 ppm Ti | — |
| CS2 | 1-Octene in Isopar E | CGC | 52,836 | 21,558 | 2.45 | 78 ppm Ti | — |

TABLE 3-continued

| Polymer properties | | | | | | | |
|---|---|---|---|---|---|---|---|
| Sample | Monomer | Polymerization Catalyst | Mw (Abs) (g/mol) | Mn (Abs) (g/mol) | Mw (Abs)/Mn (Abs) | Residual Catalyst Metal[1] | Residual Germanium[1] |
| CS3 | 1-Octene in Isopar E | Metallocene 1 | 158,646 | 79,481 | 2.00 | 46 ppm Zr | — |
| CS4 | 1-Octene in Isopar E | Metallocene 2 | 93,603 | 46,021 | 2.03 | 42 ppm Zr | — |
| IE1 | 1-Octene in Isopar E | BBP1 | 1,739,387 | 1,134,761 | 1.53 | 155 ppm Zr | 123 ppm Ge |
| IE2 | 1-Octene in Isopar-E | BBP1 | 3,713,110 | 1,892,694 | 1.96 | 64 ppm Zr | 51 ppm Ge |
| IE3 | 1-Octene in Isopar-E | BBP1 | 4,774,694 | 2,963,171 | 1.61 | 43 ppm Zr | 34 ppm Ge |
| IE4 | 1-Octene in Isopar-E | BBP1 | 6,452,334 | 3,453,915 | 1.87 | 54 ppm Zr | 43 ppm Ge |
| IE5 | 1-Hexene in Isopar-E | BBP1 | 1,748,106 | 1,122,559 | 1.56 | 90 ppm Zr | 72 ppm Ge |
| IE6 | 1-octene in Isopar-E and octene isomers | BBP 2 | 1,674,376 | 944,359 | 1.77 | 40 ppm Zr | — |
| IE7 | 1-octene in Isopar-E and octene isomers | BBP 2 | 2,243,290 | 1,070,812 | 2.09 | 44 ppm Zr | — |

[1]ppm residual catalyst metal present in homopolymer, based on the total weight of the homopolymer Table 3 shows that surprisingly polymerization with BBP catalysts (BBP 1 or BBP 2) resulted in high molecular weight octene homopolymer or hexene homopolymer (>1,300,000 g/mol) with narrow molecular weight distribution (Mw/Mn). The resulting inventive examples IE1-IE7 contain no titanium and contain residual zirconium (IE 1-5 also containing residual germanium).

Comparative examples using CGC, metallocene 1, or metallocene 2 resulted in significantly lower molecular weights when compared to IE1-IE7. Comparative example using ZN catalyst resulted in broad molecular weight distribution.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A process comprising:

contacting, under polymerization conditions, one or more monomers consisting of $C_6$-$C_{14}$ α-olefin monomers with a bis-biphenylphenoxy catalyst having the formula (V)

formula (V)

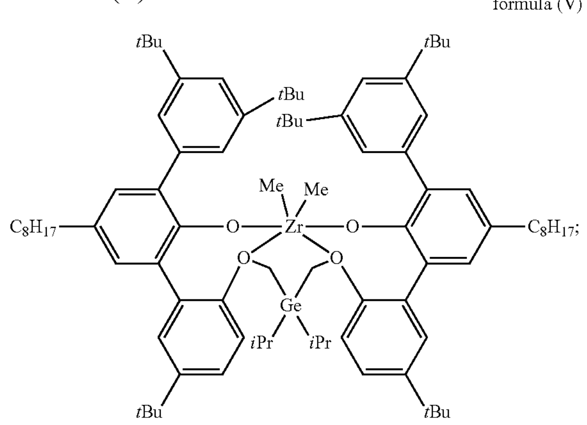

and forming a polymer with monomers consisting of one or more $C_6$-$C_{14}$ α-olefin monomers and having an absolute weight average molecular weight ($Mw_{(abs)}$) greater than 1,300,000 g/mol and a $Mw_{(abs)}/Mn_{(abs)}$ from 1.3 to 3.0, a residual amount of zirconium, and a residual amount of germanium.

2. The process of claim 1 wherein the contacting occurs at a temperature from 23° C. to 25° C.

3. The process of claim 2 comprising contacting the one or more monomers consisting of $C_6$-$C_{14}$ α-olefin monomers with the bis-biphenylphenoxy catalyst and a boron-containing co-catalyst.

4. The process of claim 1 wherein the one or more monomers consist of one or more $C_6$-$C_8$ α-olefin monomers.

5. The process of claim 4 wherein the one or more monomers consist of 1-octene monomer.

6. A process comprising:

contacting, under polymerization conditions, one or more monomers consisting of $C_6$-$C_{14}$ α-olefin monomers with a bis-biphenylphenoxy catalyst having the formula (VI)

formula (VI)

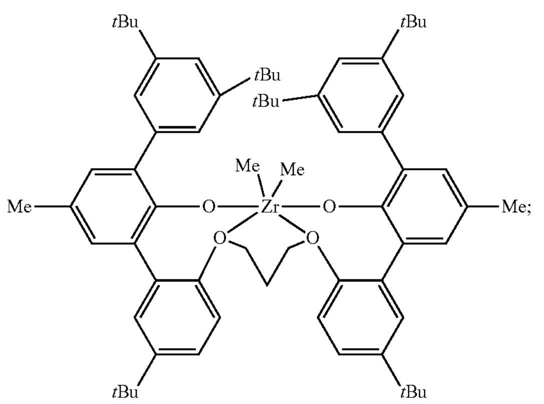

and forming a polymer with monomers consisting of one or more $C_6$-$C_{14}$ α-olefin monomers, and having an absolute weight average molecular weight ($Mw_{(abs)}$) greater than 1,300,000 g/mol and a $Mw_{(abs)}/Mn_{(abs)}$ from 1.3 to 3.0, and a residual amount of zirconium.

7. The process of claim 6 comprising contacting, under polymerization conditions, one or more monomers consisting of $C_6$-$C_8$ α-olefin monomers with the bis-biphenylphenoxy catalyst having the formula (VI); and forming a polymer with monomers consisting of one or more $C_6$-$C_8$ α-olefin monomers, the polymer comprising a residual amount of zirconium and having an absolute weight average molecular weight ($MW_{(Abs)}$) greater than 1,300,000 g/mol and a $MW_{(Abs)}/Mn_{(Abs)}$ from 1.3 to 3.0.

8. The process of claim 7 comprising contacting, under polymerization conditions, monomer consisting of 1-octene monomer with the bis-biphenylphenoxy catalyst having the formula (VI); and forming an octene homopolymer comprising a residual amount of zirconium and having an absolute weight average molecular weight ($Mw_{(Abs)}$ greater than 1,300,000 g/mol and a $Mw_{(Abs)}/Mn_{(Abs)}$ from 1.3 to 3.0.

9. The process of claim 1 comprising contacting, under polymerization conditions, monomer consisting 1-octene monomer with the bis-biphenylphenoxy catalyst having the formula (V); and forming an octene homopolymer comprising a residual amount of germanium and having an absolute weight average molecular weight ($Mw_{(Abs)}$ greater than 1,300,000 g/mol and a $Mw_{(Abs)}/Mn_{(Abs)}$ from 1.3 to 3.0.

10. The process of claim 6 wherein the contacting occurs at a temperature from 23° C. to 25° C.

* * * * *